United States Patent
Taga

(10) Patent No.: US 11,128,010 B2
(45) Date of Patent: Sep. 21, 2021

(54) BATTERY PACK

(71) Applicant: MAKITA CORPORATION, Anjo (JP)

(72) Inventor: Hideyuki Taga, Anjo (JP)

(73) Assignee: MAKITA CORPORATION, Anjo (JP)

(*) Notice: Subject to any disclaimer, the term of this patent is extended or adjusted under 35 U.S.C. 154(b) by 188 days.

(21) Appl. No.: 16/675,362

(22) Filed: Nov. 6, 2019

(65) Prior Publication Data

US 2020/0176731 A1 Jun. 4, 2020

(30) Foreign Application Priority Data

Nov. 30, 2018 (JP) .............................. JP2018-225405

(51) Int. Cl.
*H01M 10/48* (2006.01)
*H01M 50/20* (2021.01)
*H01M 10/44* (2006.01)

(52) U.S. Cl.
CPC ........... *H01M 50/20* (2021.01); *H01M 10/44* (2013.01); *H01M 10/482* (2013.01); *H01M 10/488* (2013.01)

(58) Field of Classification Search
CPC .. H01M 50/20; H01M 50/202; H01M 50/204; H01M 10/44; H01M 10/482; H01M 10/488; H01M 10/48; H01M 10/441
See application file for complete search history.

(56) References Cited

U.S. PATENT DOCUMENTS

| 9,774,065 | B2* | 9/2017 | Deng ................. H01M 10/486 |
| 2010/0156350 | A1 | 6/2010 | Murayama et al. |
| 2013/0029197 | A1 | 1/2013 | Murayama et al. |
| 2013/0082659 | A1 | 4/2013 | Kano |
| 2014/0087236 | A1 | 3/2014 | Murayama et al. |
| 2017/0122679 | A1* | 5/2017 | Kenney ..................... F28F 3/08 |
| 2017/0155104 | A1* | 6/2017 | Yoneda ................. H01M 50/24 |
| 2018/0294447 | A1* | 10/2018 | Guo .................. H01M 50/3425 |

FOREIGN PATENT DOCUMENTS

| JP | 2014-032862 A | 2/2014 |
| JP | 5436850 B2 | 3/2014 |
| JP | 5803513 B2 | 11/2015 |

\* cited by examiner

*Primary Examiner* — Raymond Alejandro
(74) *Attorney, Agent, or Firm* — Oliff PLC

(57) ABSTRACT

A battery pack may include a battery cell; a first lead plate electrically connected to a first end of the battery cell; and a first outer waterproof sheet arranged along the first lead plate and covering the first lead plate from outside. The first lead plate may include an opening, and the first outer waterproof sheet may include a ring-shaped projection formed on an inner surface of the first outer waterproof sheet. The ring-shaped projection may project toward the first lead plate and surround the opening of the first lead plate.

18 Claims, 9 Drawing Sheets

BATTERY PACK

CROSS-REFERENCE TO RELATED APPLICATION

This application claims priority to Japanese Patent Application No. 2018-225405, filed on Nov. 30, 2018 the entire contents of which are incorporated herein by reference.

TECHNICAL FIELD

The art disclosed herein relates to a battery pack used in electrical equipment such as a power tool.

BACKGROUND

Japanese Patent Application Publication No. 2014-32862 describes a battery pack. This battery pack is provided with battery cells, lead plates electrically connected to one ends of the battery cells, and a waterproof sheet provided between the battery cells and the lead plates.

SUMMARY

In some of conventional battery packs, an opening is provided in a lead plate due to various reasons. When such an opening is provided in the lead plate, there is a risk that water and foreign particles may enter from the opening. The description herein provides an art configured to suppress entry of water and foreign particles through an opening in a lead plate as above.

A battery pack disclosed herein may comprise: a battery cell; a first lead plate electrically connected to a first end of the battery cell; and a first outer waterproof sheet arranged along the first lead plate and covering the first lead plate from outside (that is, from an opposite side from the battery cell). The first lead plate comprises an opening, and the first outer waterproof sheet comprises a ring-shaped projection formed on an inner surface of the first outer waterproof sheet, the ring-shaped projection projecting toward the first lead plate and surrounding the opening of the first lead plate.

In the aforementioned battery pack, the opening of the first lead plate is covered by the first outer waterproof sheet. Especially, the first outer waterproof sheet comprises the ring-shaped projection, and the opening of the first lead plate is surrounded by the ring-shaped projection. With the ring-shaped projection making a tight contact with the first lead plate, the first lead plate and the first outer waterproof sheet are sufficiently sealed together. This can effectively suppress entry of water and foreign particles through the opening of the first lead plate.

DETAILED DESCRIPTION

Figure 1:
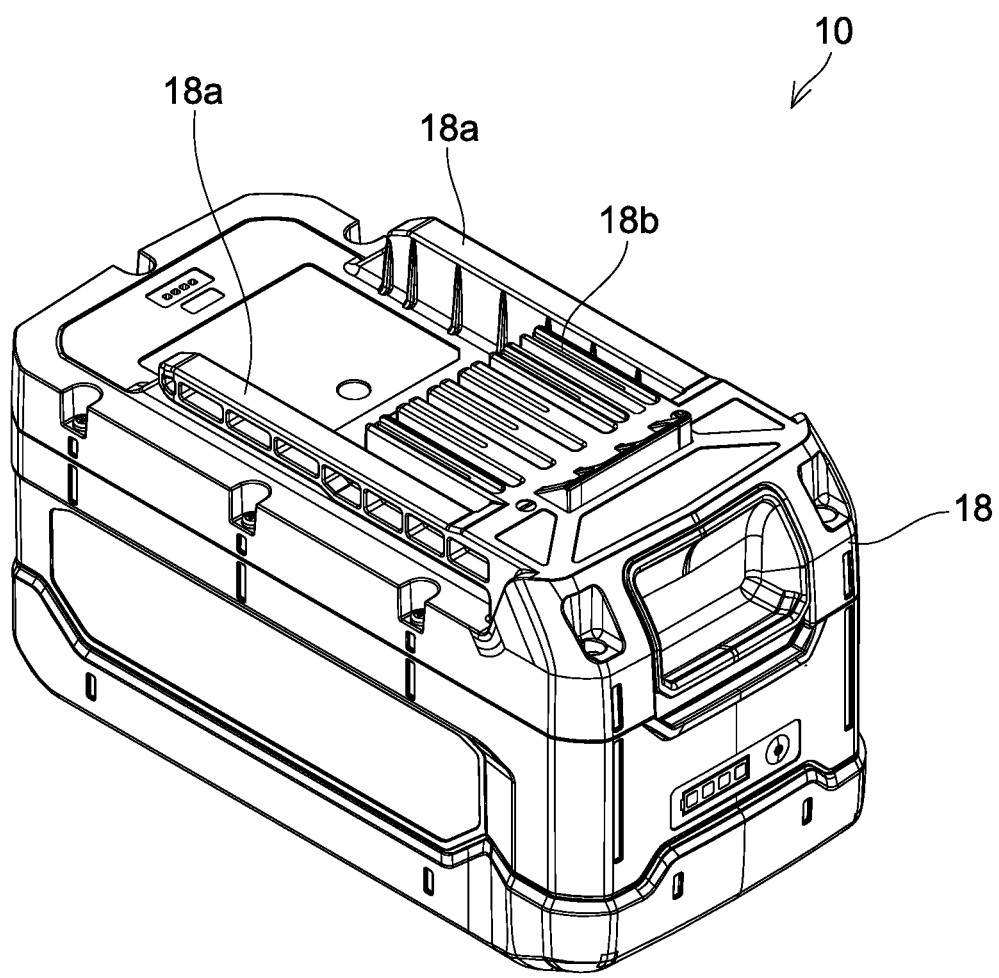
FIG. 1 is a perspective view of an outer appearance of a battery pack 10 of an embodiment.

In an embodiment of the art disclosed herein, a first outer waterproof sheet may comprise a groove formed on an inner surface of the first outer waterproof sheet, the groove extending along a ring-shaped projection. This groove may be provided on one of or both of inner and outer sides of the ring-shaped projection. According to such a configuration, the ring-shaped projection can more easily deform accompanying a contact with a first lead plate, sealing performance between the first lead plate and the first outer waterproof sheet can be improved.

In an embodiment of the art disclosed herein, the first lead plate may comprise a contact portion which makes contact with the first end of the battery cell. In this case, the opening of the first lead plate may be defined in the contact portion and expose the first end of the battery cell. When an opening (such as a slit) is defined in a contact portion, welding current can surely be conducted between a lead plate and a battery cell upon spot welding (resistance welding) the contact portion to the first end of the battery cell. Whereas on the other hand, when the opening is defined in the contact portion, the first end of the battery cell is exposed in the opening. In this case, there is a risk of contamination of the first end of the battery cell by water and foreign particles entering from the opening. However, by the aforementioned ring-shaped projection suppresses the entry of water and foreign particles through the opening, by which the contamination of the battery cell is effectively suppressed.

In the aforementioned embodiments, the battery pack may further comprise a first inner waterproof sheet arranged between the battery cell and the first lead plate. In this case, the first inner waterproof sheet may surround the contact portion of the first lead plate. According to such a configuration, the battery cell and the first lead plate are sealed together, by which water and foreign particle contamination of the contact portion of the first lead plate and the first end of the battery cell connected thereto can be suppressed.

In the aforementioned embodiments, the first inner waterproof sheet may comprise a ring-shaped projection projecting toward the first lead plate and surrounding the contact portion of the first lead plate. Such a configuration can improve sealing performance between the battery cell and the first lead plate.

In an embodiment of the art disclosed herein, the battery pack may further comprise: a second lead plate electrically connected to a second end of the battery cell opposite the first end; and a second outer waterproof sheet arranged along the second lead plate and covering the second lead plate from outside. In this case, the second lead plate may comprise an opening, and the second outer waterproof sheet may comprise a ring-shaped projection formed on an inner surface of the second outer waterproof sheet, the ring-shaped projection of the second outer waterproof sheet projecting toward the second lead plate and surrounding the opening of the second lead plate. Such a configuration can effectively suppress entry of water and foreign particles through the opening of the second lead plate.

In the aforementioned embodiments, the second outer waterproof sheet may further comprise a ring-shaped groove formed on the inner surface of the second outer waterproof sheet, the ring-shaped groove of the second outer waterproof sheet extending along the ring-shaped projection of the second outer waterproof sheet. This groove may be provided on one of or both of inner and outer sides of the ring-shaped projection. According to such a configuration, the ring-shaped projection can more easily deform accompanying a contact with the second lead plate, sealing performance between the second lead plate and the second outer waterproof sheet can be improved.

In an embodiment of the art disclosed herein, the second lead plate may comprise a contact portion which is in contact with the second end of the battery cell. In this case, the opening of the second lead plate may be defined in the contact portion of the second lead plate and expose the second end of the battery cell. Such a configuration can suppress the second end of the battery cell exposed from the opening of the second lead plate from being contaminated with water and foreign particles.

In the aforementioned embodiments, the battery pack may further comprise a second inner waterproof sheet arranged between the battery cell and the second lead plate. In this case, the second inner waterproof sheet may surround the contact portion of the second lead plate. According to such a configuration, the battery cell and the second lead plate are sealed together, by which water and foreign particle contamination of the contact portion of the second lead plate and the second end of the battery cell connected thereto can be suppressed.

In the aforementioned embodiments, the second inner waterproof sheet may comprise a ring-shaped projection projecting toward the second lead plate and surrounding the contact portion of the second lead plate. Such a configuration can improve sealing performance between the battery cell and the second lead plate.

In an embodiment of the art disclosed herein, the battery pack may further comprise a battery holder securing the battery cell, the first lead plate, and the first outer waterproof sheet to each other. In addition, the battery pack may further comprise a housing accommodating the battery holder. Specific configurations of the battery holder and the battery pack are not particularly limited.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved battery packs, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Figure 2:
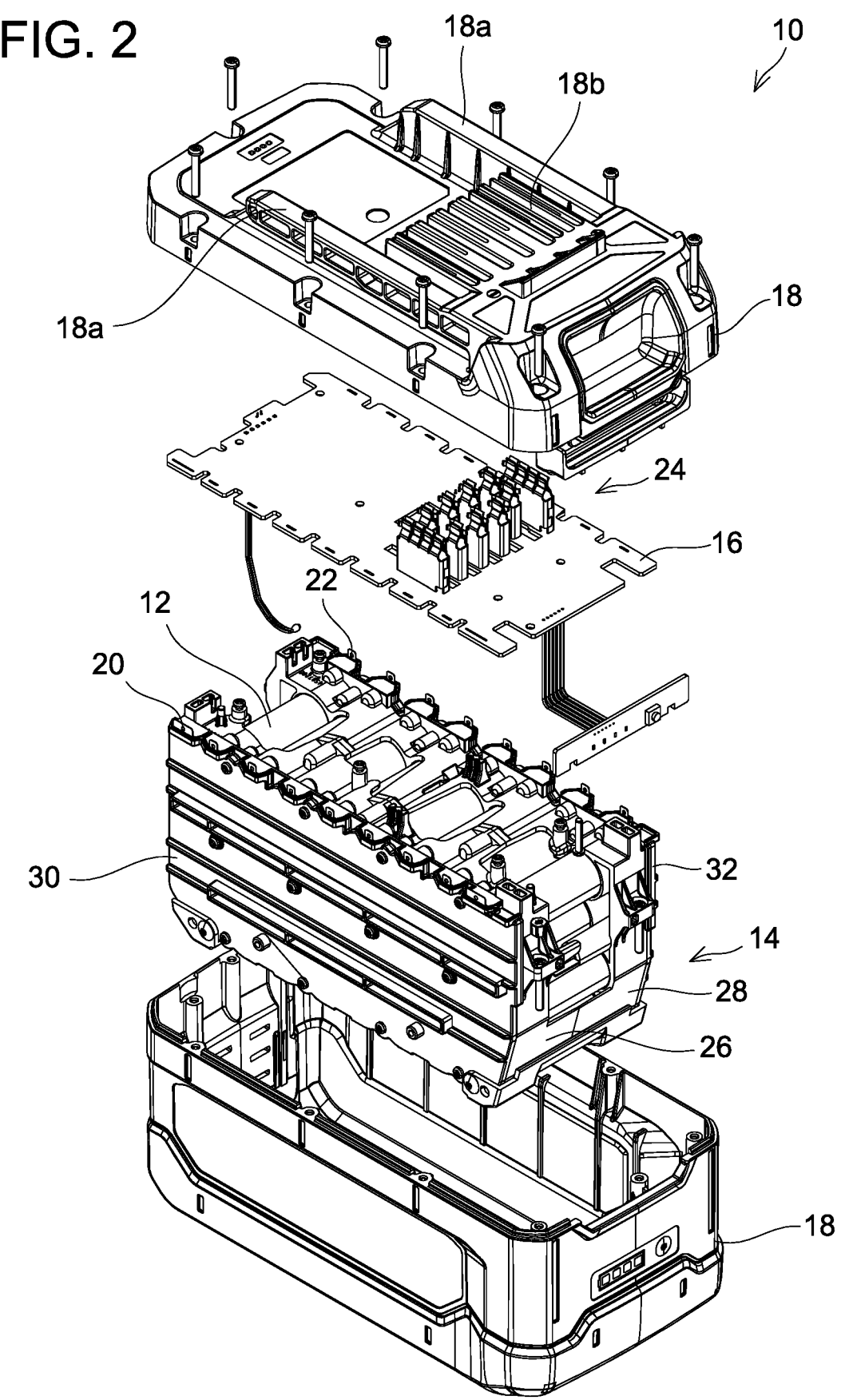
FIG. 2 is a disassembled view of the battery pack 10.

A battery pack 10 of an embodiment will be described with reference to the drawings. The battery pack 10 of the present embodiment is a rechargeable electric power storage device, and is detachably attached to electrical equipment such as a power tool (not shown) as a power source configured to supply power to the electrical equipment. As shown in FIGS. 1 and 2, the battery pack 10 includes a plurality of battery cells 12, a battery holder 14 that retains the plurality of battery cells 12, and a circuit board 16 secured to the battery holder 14 and electrically connected to the plurality of battery cells 12. Further, the battery pack 10 includes a housing 18 that accommodates the plurality of battery cells 12, the battery holder 14, and the circuit board 16.

The plurality of battery cells 12 is retained parallel to each other by the battery holder 14. Each of the battery cells 12 is a rechargeable battery cell. Although this is merely an example, each of the battery cells 12 in this embodiment is a lithium ion battery cell, and has a nominal voltage of substantially 4 volts. Further, a total number of the plurality of battery cells 12 is thirty-two, and sixteen pairs of battery cells 12 are connected in series with two battery cells 12 connected in parallel with each other constituting each pair. Due to this, the battery pack 10 has a nominal voltage of substantially 64 volts.

The battery holder 14 is constituted of an insulative material (such as a resin material). Although details will be given later, the battery holder 14 has a plurality of first lead plates 20 and a plurality of second lead plates 22 incorporated therein. The plurality of first lead plates 20 is arranged on one sidewall of the battery holder 14, and the plurality of second lead plates 22 is arranged on another sidewall of the battery holder 14. The plurality of battery cells 12 is electrically connected to each other through the plurality of first lead plates 20 and the plurality of second lead plates 22. Further, each of the first lead plates 20 and each of the second lead plates 22 are electrically connected to the circuit board 16.

The circuit board 16 is electrically connected to the plurality of battery cells 12 through the plurality of first lead plates 20 and the plurality of second lead plates 22. The circuit board 16 is configured capable of detecting a voltage of each first lead plate 20 and a voltage of each second lead plate 22, by which voltages of the respective battery cells 12 can be identified. In addition, the circuit board 16 includes a plurality of external connection terminals 24 for connecting to the electrical equipment. The plurality of external connection terminals 24 includes a pair of power terminals and several communication terminals. The pair of power terminals is electrically connected to the plurality of battery cells 12 and is configured to output discharged power from the plurality of battery cells 12 to the electrical equipment. Further, the pair of power terminals is configured to electrically connect to a charger (not shown), and is configured to receive charging power from the charger to the plurality of battery cells 12. The communication terminals are connected to a processor (not shown) provided in the circuit board 16.

The housing 18 has a substantially rectangular solid outer shape, and is constituted of a resin material. An engagement structure 18a for engaging with the electrical equipment and a plurality of openings 18b (such as slits) configured to accept connection terminals of the electrical equipment are provided on an upper surface of the housing 18. The plurality of external connection terminals 24 on the circuit board 16 is respectively arranged inside the plurality of openings 18b. A configuration of the housing 18 described herein is an example, and a specific configuration of the housing 18 can suitably be modified.

Figure 3:
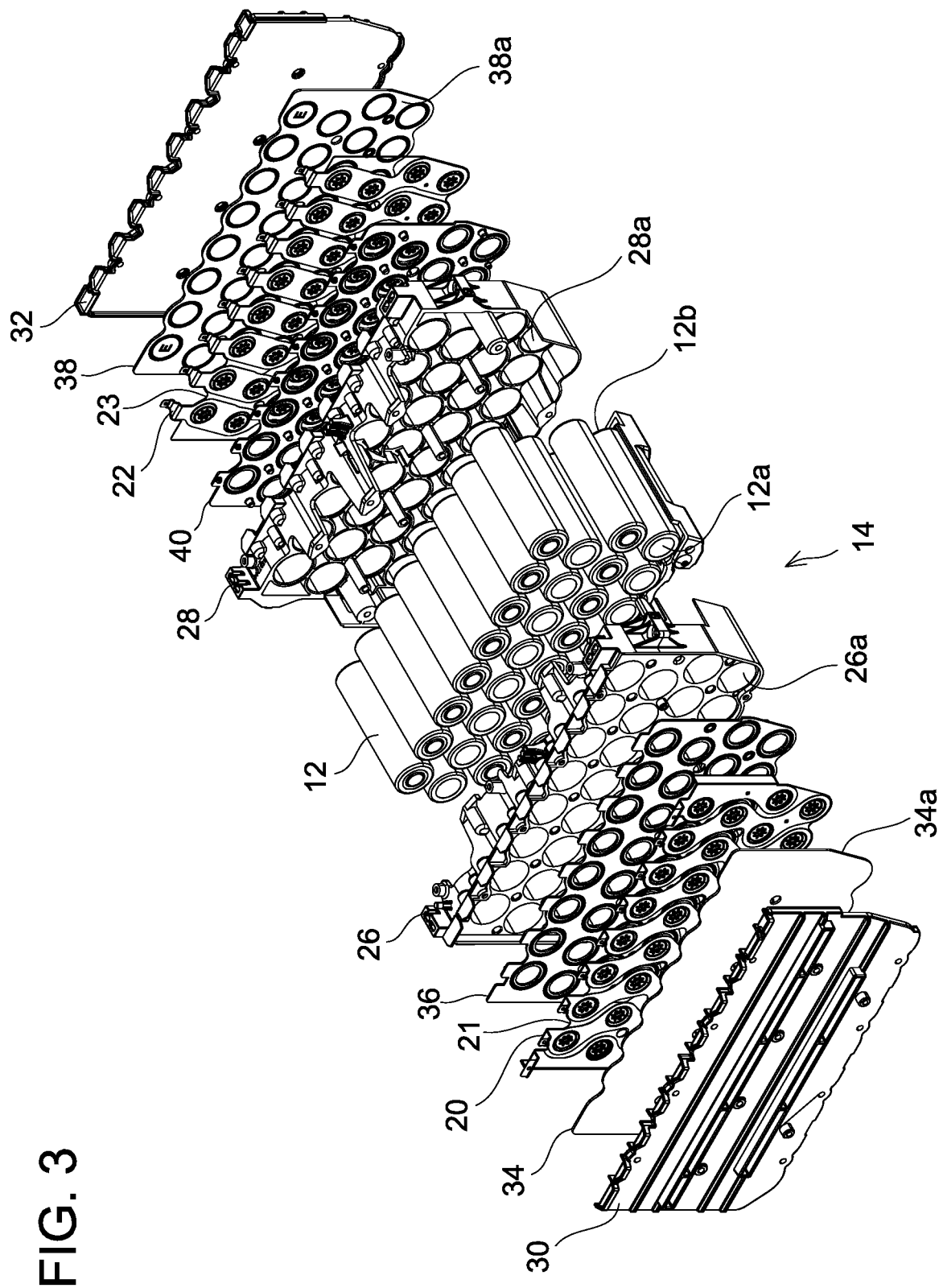
FIG. 3 is a disassembled view of a battery holder 14.

Next, a structure of the battery holder 14 will be described with reference to FIG. 3.

The battery holder 14 includes a first holder body 26 and a second holder body 28. The first holder body 26 and the second holder body 28 are secured to each other with the plurality of battery cells 12 interposed in between them, and retain the plurality of battery cells 12 parallel to each other. The battery holder 14 is further provided with a first holder cover 30 and a second holder cover 32. The first holder cover 30 is attached to the first holder body 26 with the plurality of first lead plates 20 interposed in between them, and secure the plurality of first lead plates 20 relative to the first holder body 26 (that is, relative to the plurality of battery cells 12). The second holder cover 32 is attached to the second holder body 28 with the plurality of second lead plates 22 interposed in between them, and secure the plurality of second lead plates 22 relative to the second holder body 28 (that is, relative to the plurality of battery cells 12).

The first holder body 26 has defined therein a plurality of through holes 26a that each exposes the first end 12a of its corresponding one of the plurality of battery cells 12, and the second holder body 28 has defined therein a plurality of through holes 28a that each exposes the second end 12b of its corresponding one of the plurality of battery cells 12.

Orientations of the plurality of battery cells 12 are not identical. That is, some battery cells 12 have positive electrodes at their first ends 12a and negative electrodes at their second ends 12b, and other battery cells 12 have negative electrodes at their first ends 12a and positive electrodes at their second ends 12b. However, all of the battery cells 12 have a columnar shape extending from the first end 12a to the second end 12b located on an opposite side thereof.

A first outer waterproof sheet 34 is provided between the first holder cover 30 and the plurality of first lead plates 20 and a first inner waterproof sheet 36 is provided between the plurality of first lead plates 20 and the first holder body 26. The first outer waterproof sheet 34 and the first inner waterproof sheet 36 are constituted of silicone rubber, and are configured to suppress moisture and small foreign particles from entering. The plurality of first lead plates 20 is integrally retained between a pair of films 21 by laminating. Similarly, a second outer waterproof sheet 38 is provided between the second holder cover 32 and the plurality of second lead plates 22 and a second inner waterproof sheet 40 is provided between the plurality of second lead plates 22 and the second holder body 28. The second outer waterproof sheet 38 and the second inner waterproof sheet 40 are also constituted of silicone rubber, and are configured to suppress moisture and small foreign particles from entering. The plurality of second lead plates 22 is also integrally retained between a pair of films 23 by laminating. Each of the waterproof sheets 34, 36, 38, 40 is not limited to silicone rubber, and may be constituted of other flexible material having waterproof capability such as elastomer and other polymer materials.

Figure 4:
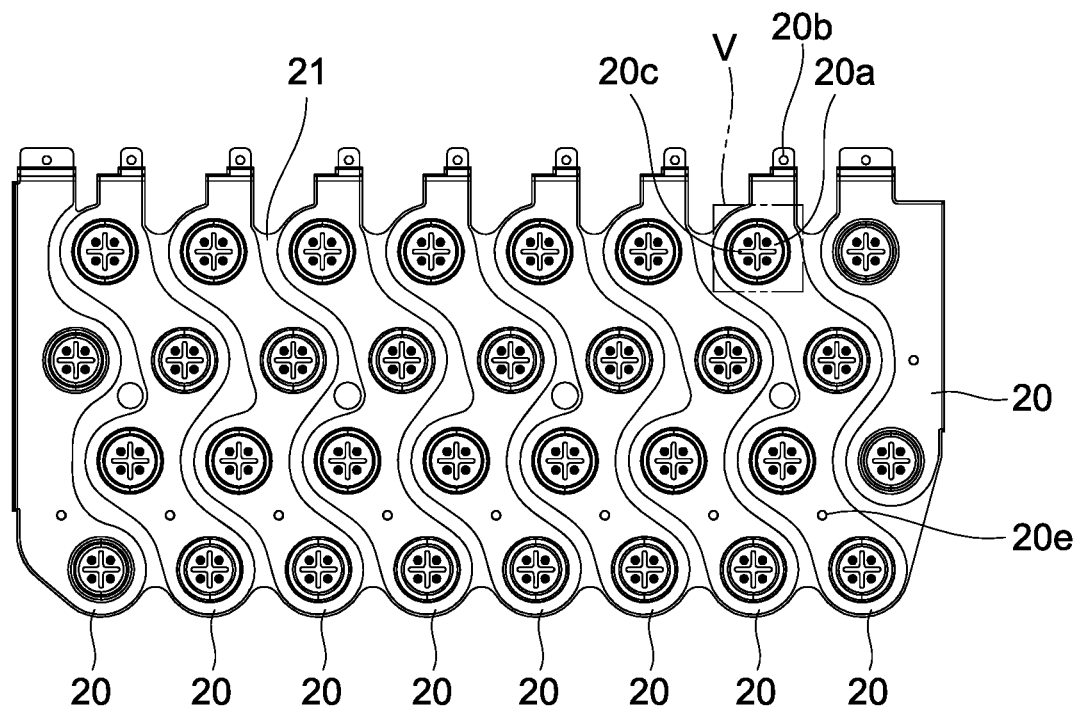
FIG. 4 is a diagram showing a plurality of first lead plates 20.
Figure 5:
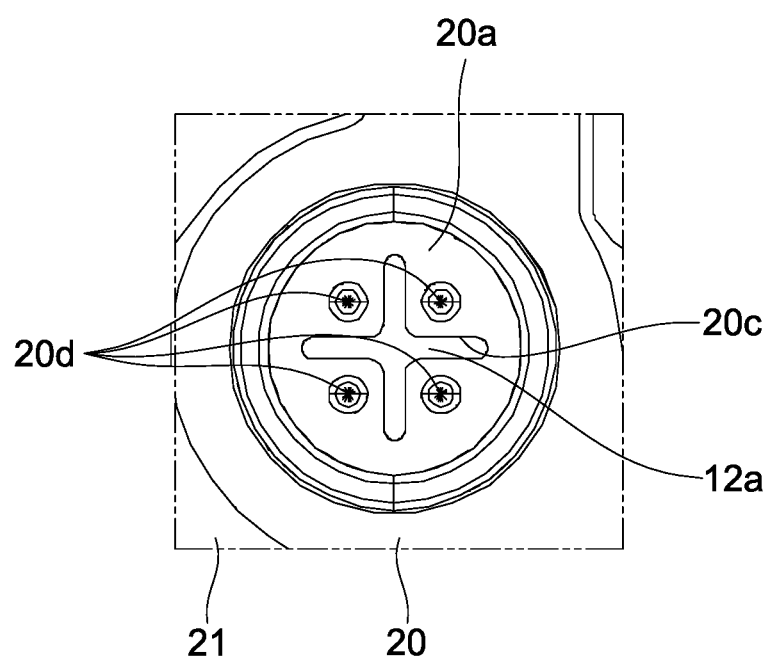
FIG. 5 is a diagram showing an enlarged view of a part V in FIG. 4.
Figure 8:
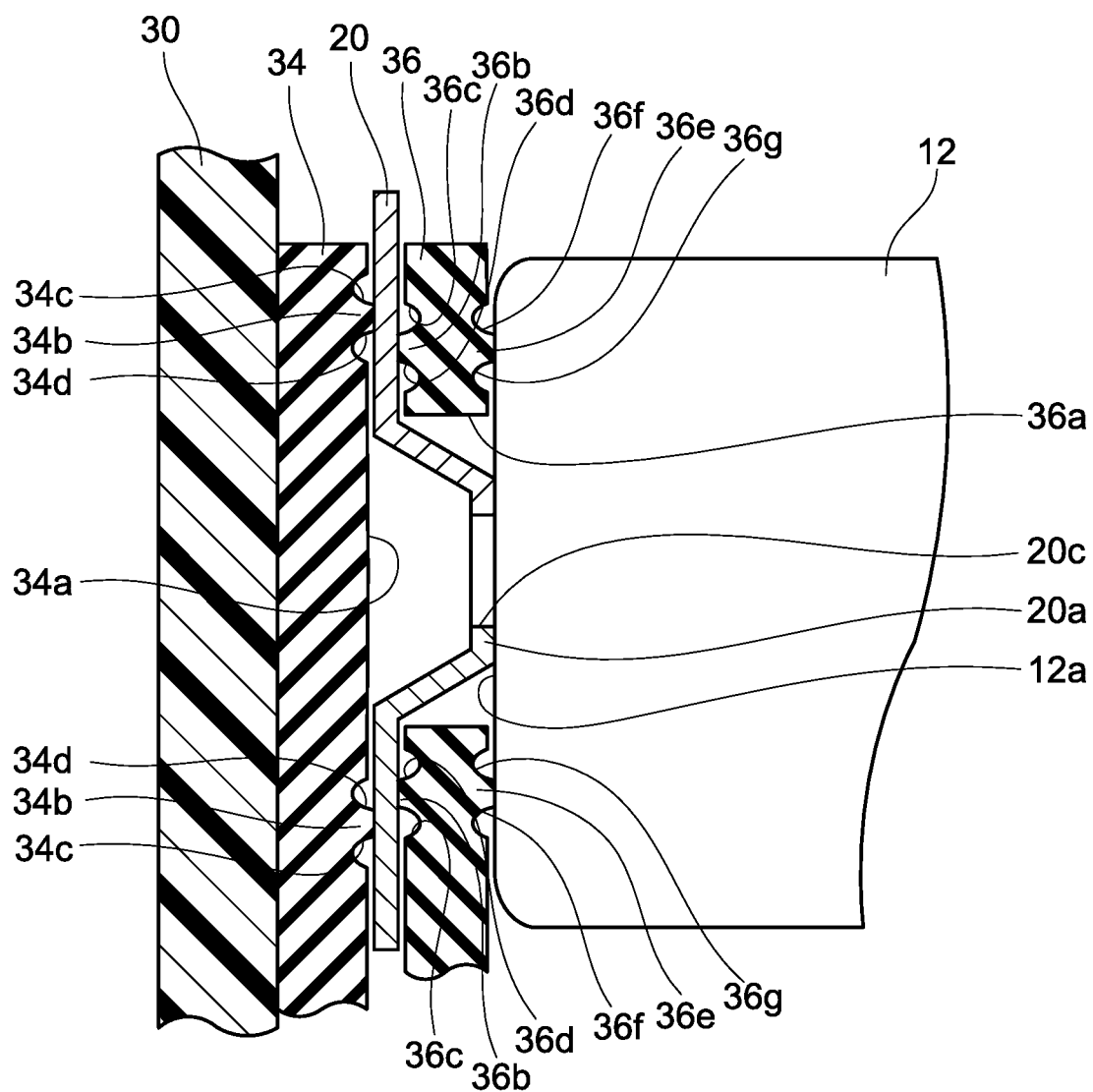
FIG. 8 is a cross-sectional view schematically showing a battery cell 12, a first lead plate 20, a first outer waterproof sheet 34, and the first inner waterproof sheet 36.

The plurality of first lead plates 20 will be described with reference to FIGS. 4, 5, and 8. The plurality of first lead plates 20 is arranged along a plane that is orthogonal to a longitudinal direction of the battery cells 12. Each of the first lead plates 20 includes a plurality of contact portions 20a and a terminal portion 20b. Each of the first lead plates 20 is electrically connected to the plurality of battery cells 12 at the contact portions 20a and is electrically connected to the circuit board 16 at the terminal portion 20b. Each of the contact portions 20a projects toward the plurality of battery cells 12, and is in contact with the first end 12a of its corresponding one of the battery cells 12. Although this is merely an example, each of the contact portions 20a is spot-welded (resistance-welded) to the first end 12a of the corresponding battery cell 12, and includes a plurality of welding portions 20d.

One or a plurality of first openings 20c is defined in each of the first lead plates 20. The first opening 20c is provided in each contact portion 20a. The first opening 20c is a cross-shaped slit, and is interposed between adjacent pairs of the welding portions 20d. With the openings 20c provided in the contact portions 20a, welding current can surely be conducted to the lead plate 20 and the battery cells 12 upon spot-welding (resistance-welding) the contact portions 20a to the first ends 12a of the battery cells 12. The first openings 20c in the present embodiment are the cross-shaped slits, however, a shape of the first openings 20c is not particularly limited. The first ends 12a of the battery cells 12 are exposed in the first openings 20c. Each of the first lead plates 20 further has one or a plurality of second openings 20e defined therein. Each second opening 20e is provided for positioning its corresponding first lead plate 20, and is configured to receive a positioning pin (not shown).

Figure 6:
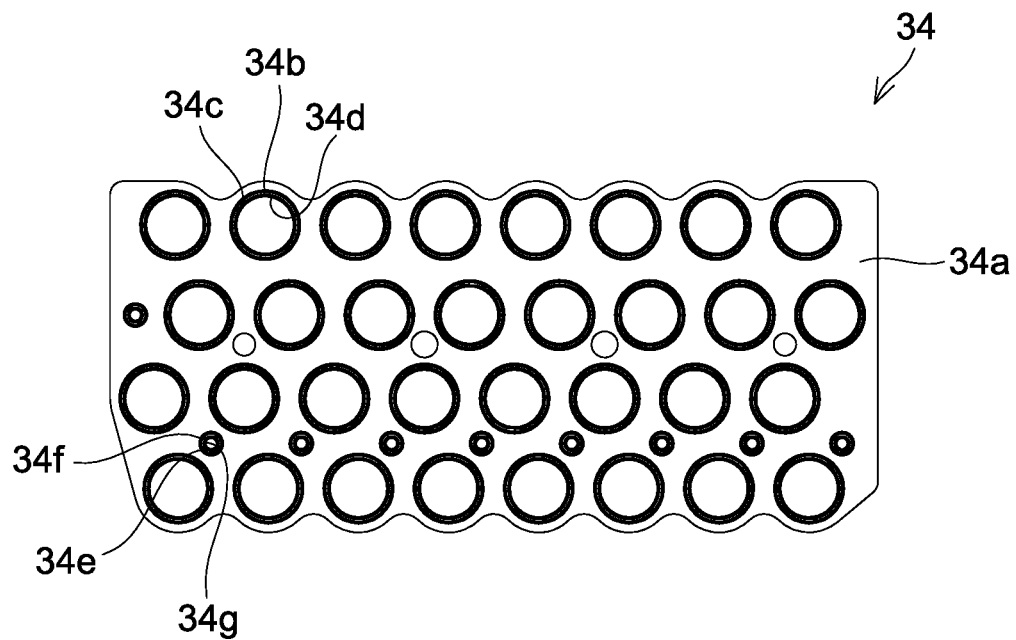
FIG. 6 is a diagram showing a first outer waterproof sheet 34.

The first outer waterproof sheet 34 will be described with reference to FIGS. 6 and 8. The first outer waterproof sheet 34 is arranged along the plurality of first lead plates 20 and covers the plurality of first lead plates 20 from outside (that is, from an opposite side relative to the plurality of battery cells 12). A plurality of first projections 34b is provided on an inner surface 34a of the first outer waterproof sheet 34. Each first projection 34b projects toward the first lead plates 20, and is arranged in a ring shape so as to surround its corresponding one of the first openings 20c of the first lead plates 20. The first lead plates 20 and the first outer waterproof sheet 34 are sufficiently sealed together by the ring-shaped first projections 34b making firm contact with the first lead plates 20. This effectively suppresses entry of water and foreign particles through the first openings 20c of the first lead plates 20, and suppresses contamination (or corrosion) of the first ends 12a of the battery cells 12 exposed in the first openings 20c.

Outer grooves 34c and inner grooves 34d are provided on the inner surface 34a of the first outer waterproof sheet 34 corresponding respectively to the first projections 34b. Each outer groove 34c is located outside its corresponding first projection 34b, and extends in a ring shape along the corresponding first projection 34b. Each inner groove 34d is located inside its corresponding first projection 34b, and extends in a ring shape along the corresponding first projection 34b. According to such a configuration, the ring-shaped first projections 34b can easily deform accompanying contact with the first lead plates 20, thus sealing performance between the first lead plates 20 and the first outer waterproof sheet 34 can be improved.

The inner surface 34a of the first outer waterproof sheet 34 is further provided with a plurality of second projections 34e. Each second projection 34e projects toward the first lead plates 20, and is arranged in a ring shape so as to surround its corresponding one of the second openings 20e of the first lead plates 20. As for the second projections 34e as well, the first lead plates 20 and the first outer waterproof sheet 34 are sufficiently sealed together by the ring-shaped second projections 34e making firm contact with the first lead plates 20. This effectively suppresses entry of water and foreign particles through the second openings 20e of the first lead plates 20, and suppresses contamination (or corrosion) of the battery cells 12. The inner surface 34a of the first outer waterproof sheet 34 includes outer grooves 34f and inner grooves 34g corresponding respectively to the second projections 34e. Each outer groove 34f is located outside its corresponding second projection 34e, and extends in a ring shape along the corresponding second projection 34e. Each inner groove 34g is located inside its corresponding second projection 34e, and extends in a ring shape along the corresponding second projection 34e.

Figure 7:
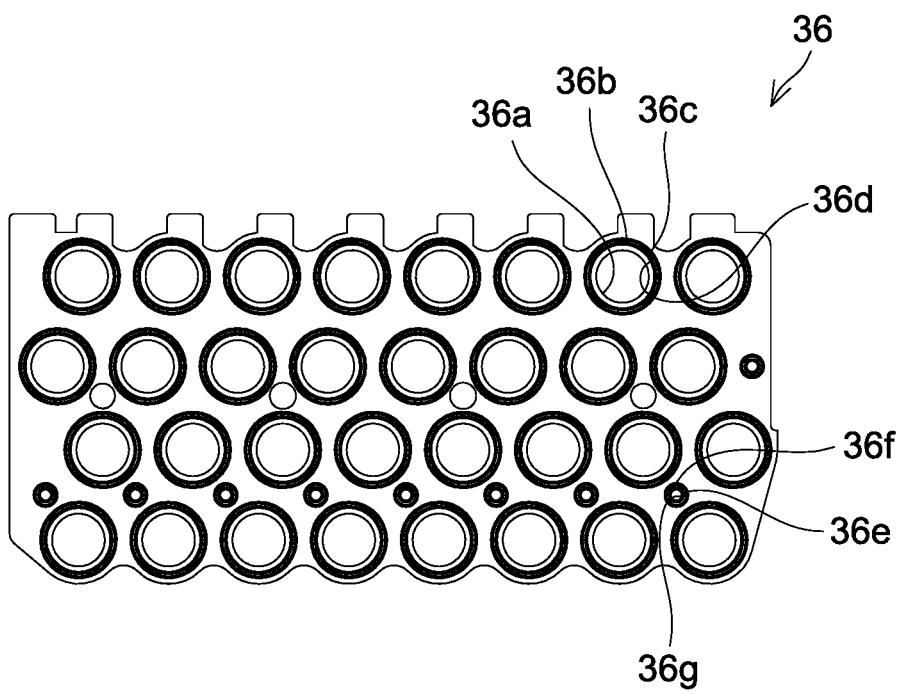
FIG. 7 is a diagram showing a first inner waterproof sheet 36.

The first inner waterproof sheet 36 will be described with reference to FIGS. 7 and 8. The first inner waterproof sheet 36 is located between the plurality of battery cells 12 and the plurality of first lead plates 20. The first inner waterproof sheet 36 has defined therein a plurality of openings 36a corresponding to positions of the plurality of battery cells 12 (or the contact portions 20a of the plurality of first lead plates 20). This allows the first inner waterproof sheet 36 respectively to surround the plurality of contact portions 20a provided in the plurality of first lead plates 20. The first inner waterproof sheet 36 seals the battery cells 12 and the first lead plates 20 together. As such, the contact portions 20a of the first lead plates 20 and the first ends 12a of the battery cells 12 connected thereto are suppressed from being contaminated by water or foreign particles.

The first inner waterproof sheet 36 includes ring-shaped projections 36b, 36e projecting toward the first lead plates 20 and respectively surrounding the first openings 20c and the second openings 20e of the first lead plates 20. The projections 36b that surround the first openings 20c surround not only the first openings 20c but also entireties of the contact portions 20a of the first lead plates 20. Further, the first inner waterproof sheet 36 includes outer grooves 36c, 36f and inner grooves 36d, 36g corresponding respectively to the projections 36b, 36e. This improves sealing performance between the battery cells 12 and the first lead plates 20.

Figure 9:
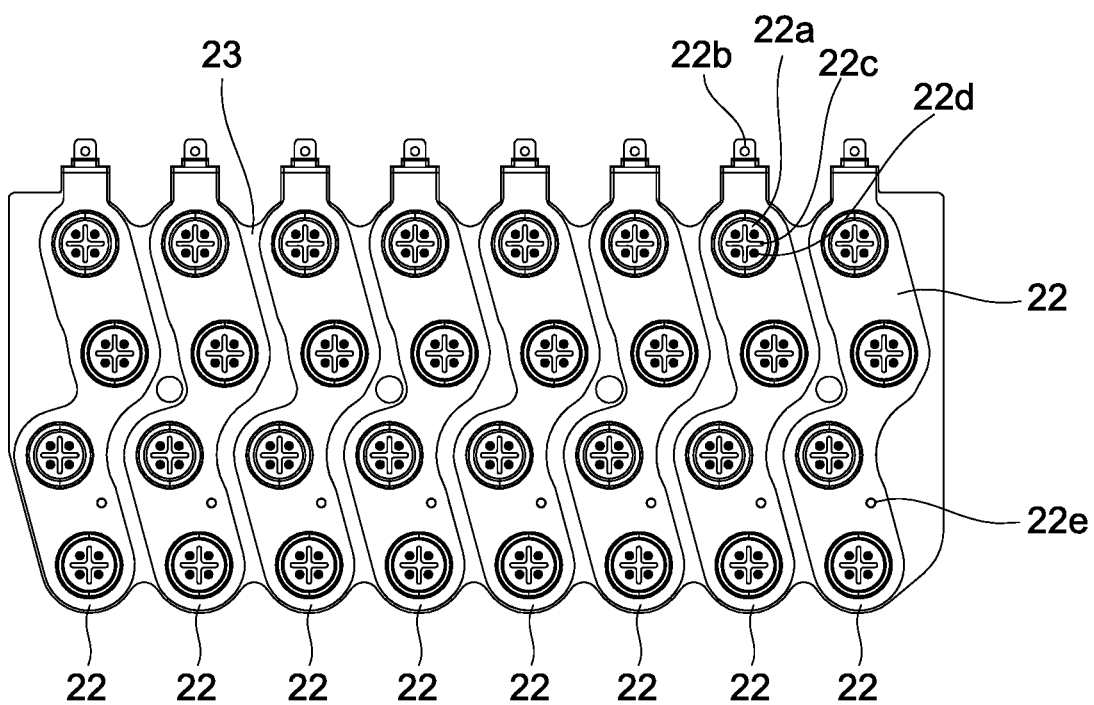
FIG. 9 is a diagram showing a plurality of second lead plates 22.
Figure 12:
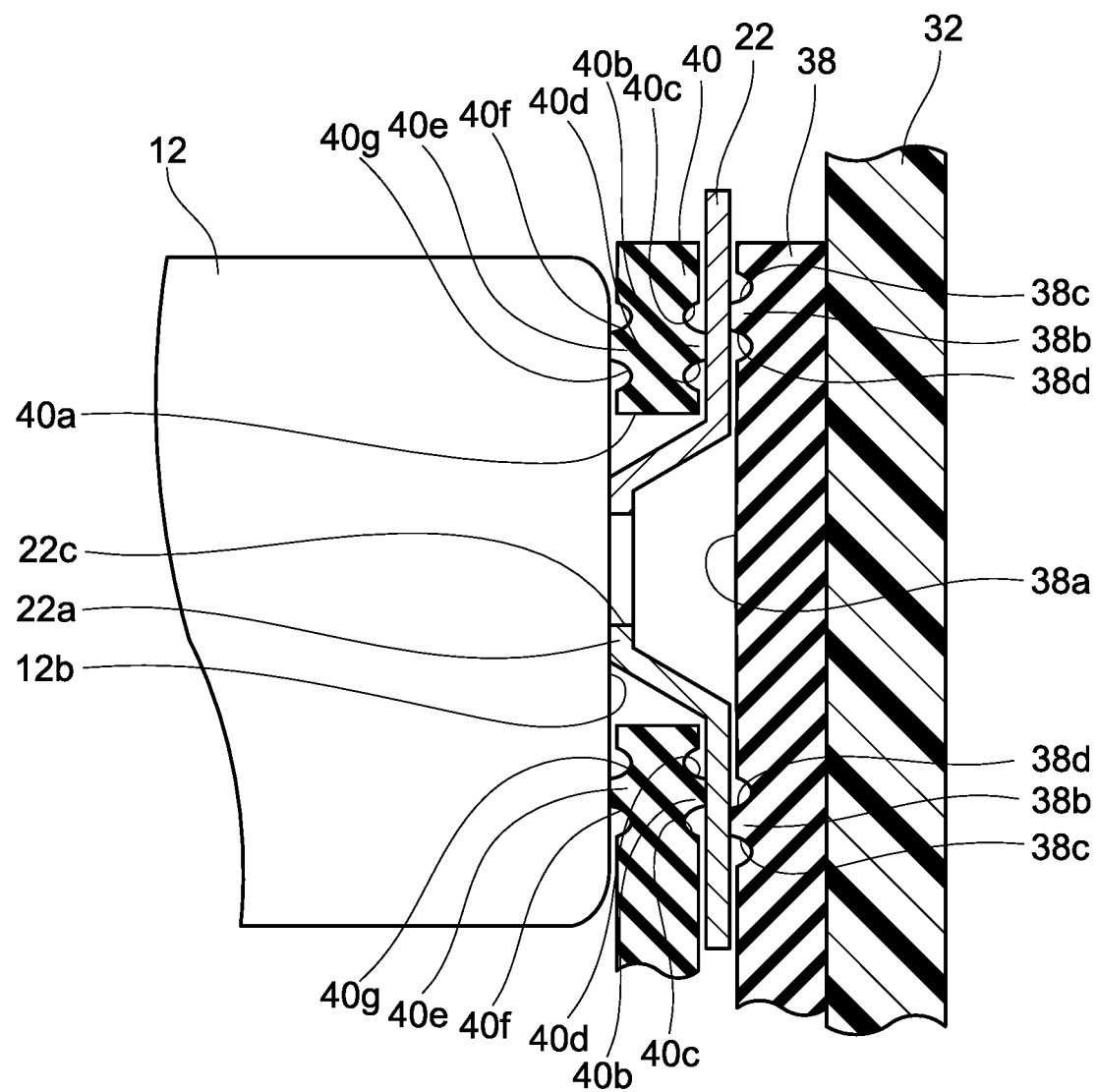
FIG. 12 is a cross-sectional view schematically showing a battery cell 12, a second lead plate 22, a second outer waterproof sheet 38, and a second inner waterproof sheet 40.

In the battery pack 10 of the present embodiment, configurations of the aforementioned first lead plates 20, first outer waterproof sheet 34, and first inner waterproof sheet 36 are employed respectively in the second lead plates 22, the second outer waterproof sheet 38, and the second inner waterproof sheet 40. As shown in FIGS. 9 and 12, the plurality of second lead plates 22 is arranged along a plane orthogonal to the longitudinal direction of the battery cells 12. Each of the second lead plates 22 includes a plurality of contact portions 22a and a terminal portion 22b. Each of the second lead plates 22 is electrically connected to the plurality of battery cells 12 at the contact portions 22a and is electrically connected to the circuit board 16 at the terminal portion 22b. Each of the contact portions 22a projects toward the plurality of battery cells 12, and is in contact with the second end 12b of its corresponding one of the battery cells 12. Each of the contact portions 22a is spot-welded (resistance-welded) to the second end 12b of the corresponding battery cell 12, and includes a plurality of welding portions 22d.

Each of the second lead plates 22 has defined therein one or a plurality of third openings 22c and one or a plurality of fourth openings 22e. The third openings 22c are provided in the contact portions 22a of the second lead plates 22 and expose the second ends 12b of the battery cells 12. The second openings 20e are provided for positioning the second lead plates 22.

Figure 10:
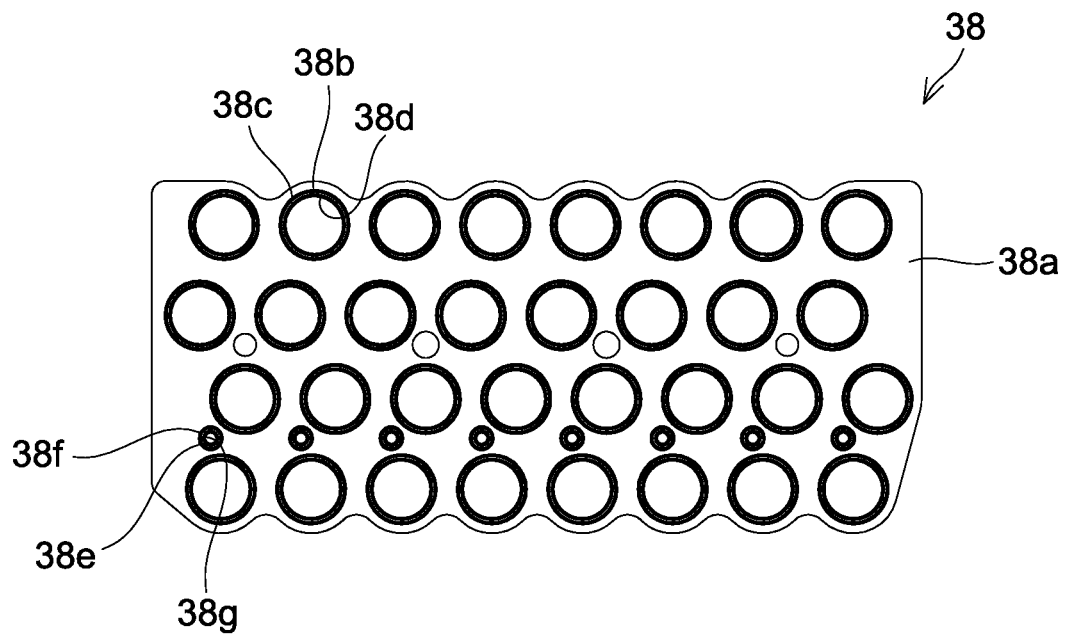
FIG. 10 is a diagram showing a second outer waterproof sheet 38.

As shown in FIGS. 10 and 12, the second outer waterproof sheet 38 is arranged along the plurality of second lead plates 22 and covers the plurality of second lead plates 22 from outside (that is, from an opposite side relative to the plurality of battery cells 12). A plurality of third projections 38b and a plurality of fourth projections 38e are provided on an inner surface 38a of the second outer waterproof sheet 38. Each third projection 38b projects toward the second lead plates 22, and is arranged in a ring shape so as to surround its corresponding one of the third openings 22c of the second lead plates 22. Each fourth projection 38e projects toward the second lead plates 22, and is arranged in a ring shape so as to surround its corresponding one of the fourth openings 22e of the second lead plates 22. This effectively suppresses entry of water and foreign particles through the openings 22c, 22e of the second lead plates 22.

Figure 11:
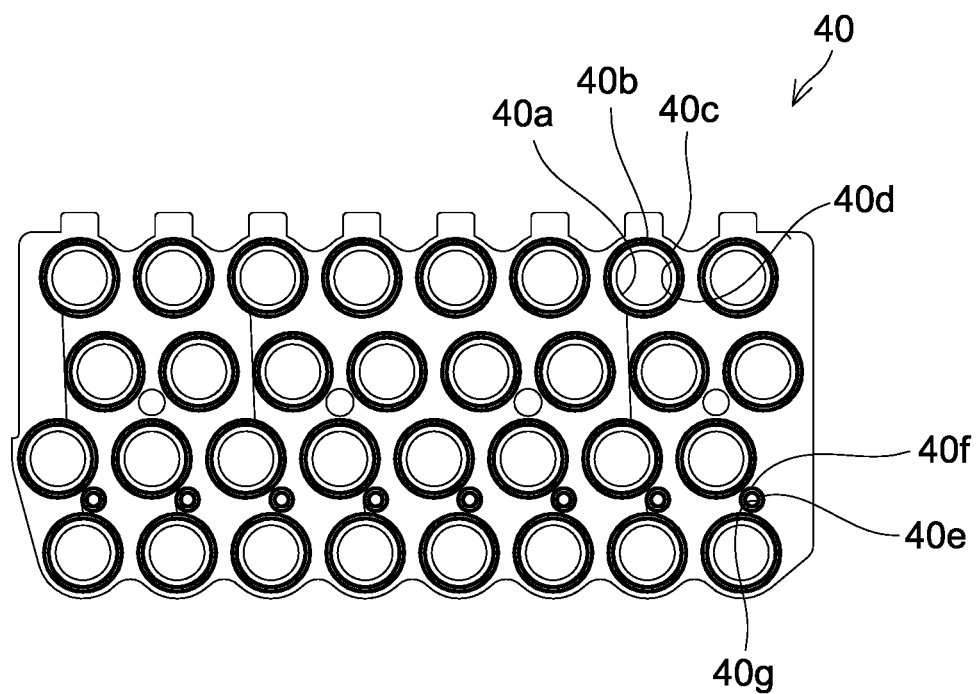
FIG. 11 is a diagram showing a second inner waterproof sheet 40.

As shown in FIGS. 11 and 12, the second inner waterproof sheet 40 is located between the plurality of battery cells 12 and the plurality of second lead plates 22. The second inner waterproof sheet 40 has defined therein a plurality of openings 40a corresponding to positions of the plurality of battery cells 12 (or the contact portions 22a of the plurality of second lead plates 22). This allows the second inner waterproof sheet 40 to respectively surround the plurality of contact portions 22a provided in the plurality of second lead plates 22. The second inner waterproof sheet 40 seals the battery cells 12 and the second lead plates 22 together. The second inner waterproof sheet 40 includes ring-shaped projections 40b, 40e that project toward the second lead plates 22 and respectively surround the third openings 22c and the fourth openings 22e of the second lead plates 22. The projections 40b that surround the third openings 22c surround not only the third openings 22c but also entireties of the contact portions 22a of the second lead plates 22. Further, the second inner waterproof sheet 40 includes outer grooves 40c, 40f and inner grooves 40d, 40g corresponding respectively to the projections 40b, 40e. This improves sealing performance between the battery cells 12 and the second lead plates 22.

What is claimed is:

1. A battery pack comprising:
    a battery cell;
    a first lead plate electrically connected to a first end of the battery cell; and
    a first outer waterproof sheet arranged along the first lead plate and covering the first lead plate from outside,
    wherein
    the first lead plate comprises an opening, and
    the first outer waterproof sheet comprises a ring-shaped projection formed on an inner surface of the first outer waterproof sheet, the ring-shaped projection projecting toward the first lead plate and surrounding the opening of the first lead plate.

2. The battery pack according to claim 1, wherein the first outer waterproof sheet further comprises a groove formed on the inner surface of the first outer waterproof sheet, the groove extending along the ring-shaped projection.

3. The battery pack according to claim 1, wherein
the first lead plate comprises a contact portion which makes contact with the first end of the battery cell, and the opening of the first lead plate is defined in the contact portion and exposes the first end of the battery cell.

4. The battery pack according to claim 1, further comprising a first inner waterproof sheet arranged between the battery cell and the first lead plate and surrounding the contact portion of the first lead plate.

5. The battery pack according to claim 4, wherein the first inner waterproof sheet comprises a ring-shaped projection projecting toward the first lead plate and surrounding the contact portion of the first lead plate.

6. The battery pack according to claim 1, further comprising:
a second lead plate electrically connected to a second end of the battery cell opposite the first end; and
a second outer waterproof sheet arranged along the second lead plate and covering the second lead plate from outside,
wherein the second lead plate comprises an opening, and the second outer waterproof sheet comprises a ring-shaped projection formed on an inner surface of the second outer waterproof sheet, the ring-shaped projection of the second outer waterproof sheet projecting toward the second lead plate and surrounding the opening of the second lead plate.

7. The battery pack according to claim 6, wherein the second outer waterproof sheet further comprises a ring-shaped groove formed on the inner surface of the second outer waterproof sheet, the ring-shaped groove of the second outer waterproof sheet extending along the ring-shaped projection of the second outer waterproof sheet.

8. The battery pack according to claim 6, wherein
the second lead plate comprises a contact portion which makes contact with the second end of the battery cell, and
the opening of the second lead plate is defined in the contact portion of the second lead plate and exposes the second end of the battery cell.

9. The battery pack according to claim 8, further comprising a second inner waterproof sheet arranged between the battery cell and the second lead plate and surrounding the contact portion of the second lead plate.

10. The battery pack according to claim 9, wherein the second inner waterproof sheet comprises a ring-shaped projection projecting toward the second lead plate and surrounding the contact portion of the second lead plate.

11. The battery pack according to claim 1, further comprising a battery holder securing the battery cell, the first lead plate, and the first outer waterproof sheet to each other.

12. The battery pack according to claim 11, further comprising a housing accommodating the battery holder.

13. The battery pack according to claim 1, wherein
the first outer waterproof sheet further comprises a groove formed on the inner surface of the first outer waterproof sheet, the groove extending along the ring-shaped projection,
the first lead plate comprises a contact portion which makes contact with the first end of the battery cell, and
the opening of the first lead plate is defined in the contact portion and exposes the first end of the battery cell.

14. The battery pack according to claim 13, further comprising a first inner waterproof sheet arranged between the battery cell and the first lead plate and surrounding the contact portion of the first lead plate,
wherein the first inner waterproof sheet comprises a ring-shaped projection projecting toward the first lead plate and surrounding the contact portion of the first lead plate.

15. The battery pack according to claim 1, further comprising:
a second lead plate electrically connected to a second end of the battery cell opposite the first end; and
a second outer waterproof sheet arranged along the second lead plate and covering the second lead plate from outside,
wherein the second lead plate comprises an opening,
the second outer waterproof sheet comprises a ring-shaped projection formed on an inner surface of the second outer waterproof sheet, the ring-shaped projection of the second outer waterproof sheet projecting toward the second lead plate and surrounding the opening of the second lead plate, and
the second outer waterproof sheet further comprises a ring-shaped groove formed on the inner surface of the second outer waterproof sheet, the ring-shaped groove of the second outer waterproof sheet extending along the ring-shaped projection of the second outer waterproof sheet.

16. The battery pack according to claim 15, wherein
the second lead plate comprises a contact portion which makes contact with the second end of the battery cell,
the opening of the second lead plate is defined in the contact portion of the second lead plate and exposes the second end of the battery cell,
the battery pack further comprises a second inner waterproof sheet arranged between the battery cell and the second lead plate and surrounding the contact portion of the second lead plate, and
the second inner waterproof sheet comprises a ring-shaped projection projecting toward the second lead plate and surrounding the contact portion of the second lead plate.

17. The battery pack according to claim 16, further comprising a battery holder securing the battery cell, the first lead plate, the first outer waterproof sheet, the first inner waterproof sheet, the second lead plate, the second outer waterproof sheet, the second inner waterproof sheet to each other.

18. The battery pack according to claim 17, further comprising a housing accommodating the battery holder.

* * * * *